US007305273B2

(12) United States Patent
Fay et al.

(10) Patent No.: US 7,305,273 B2
(45) Date of Patent: Dec. 4, 2007

(54) AUDIO GENERATION SYSTEM MANAGER

(75) Inventors: Todor J. Fay, Bellevue, WA (US); Brian L. Schmidt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 09/801,922

(22) Filed: Mar. 7, 2001

(65) Prior Publication Data

US 2002/0143413 A1 Oct. 3, 2002

(51) Int. Cl.
*G06F 17/00* (2006.01)
*G10H 3/00* (2006.01)

(52) U.S. Cl. .......................................... 700/94; 84/645

(58) Field of Classification Search .................. 700/94; 84/645
See application file for complete search history.

(56) References Cited

U.S. PATENT DOCUMENTS

| | | | | |
|---|---|---|---|---|
| 5,142,961 | A | | 9/1992 | Paroutaud |
| 5,303,218 | A | * | 4/1994 | Miyake ..................... 369/47.2 |
| 5,315,057 | A | | 5/1994 | Land et al. |
| 5,331,111 | A | | 7/1994 | Connell |
| 5,483,618 | A | | 1/1996 | Johnson et al. |
| 5,511,002 | A | | 4/1996 | Milne et al. |
| 5,548,759 | A | | 8/1996 | Lipe |
| 5,565,908 | A | | 10/1996 | Ahmad |
| 5,596,159 | A | * | 1/1997 | O'Connell ................... 84/622 |
| 5,717,154 | A | | 2/1998 | Gulick |
| 5,734,119 | A | | 3/1998 | France et al. |
| 5,761,684 | A | | 6/1998 | Gibson |
| 5,778,187 | A | | 7/1998 | Monteiro et al. |
| 5,792,971 | A | | 8/1998 | Timis et al. |
| 5,842,014 | A | * | 11/1998 | Brooks et al. .............. 718/103 |
| 5,852,251 | A | * | 12/1998 | Su et al. ........................ 84/645 |
| 5,890,017 | A | | 3/1999 | Tulkoff et al. |
| 5,902,947 | A | | 5/1999 | Burton et al. |
| 5,942,707 | A | * | 8/1999 | Tamura ....................... 84/604 |
| 5,977,471 | A | | 11/1999 | Rosenzweig |
| 5,990,879 | A | | 11/1999 | Mince |
| 6,044,408 | A | | 3/2000 | Engstrom et al. |
| 6,100,461 | A | | 8/2000 | Hewitt |
| 6,152,856 | A | * | 11/2000 | Studor et al. .................. 482/8 |
| 6,160,213 | A | | 12/2000 | Arnold et al. |
| 6,169,242 | B1 | | 1/2001 | Fay et al. |

(Continued)

OTHER PUBLICATIONS

J. Piche et al., "Cecilia: A Production Interface to Csound", Computer Music Journal vol. 22, No. 2 pp. 52-55 (Summer 1998).

(Continued)

*Primary Examiner*—Sinh Tran
*Assistant Examiner*—Daniel R Sellers

(57) ABSTRACT

An audio generation system includes a performance manager, which is an audio source manager, and an audio rendition manager to produce a rendition corresponding to an audio source. An application program provides the audio source manager and the audio rendition manager. The audio source manager receives audio content from an audio source, provides one or more audio content components that generate event instructions from the received audio content, and processes the event instructions to produce audio instructions that are provided to the audio rendition manager. The audio rendition manager provides processing components to process the audio instructions, including a synthesizer component that receives the audio instructions and generates audio sound wave data, and audio buffers that process the audio sound wave data.

51 Claims, 8 Drawing Sheets

U.S. PATENT DOCUMENTS

| | | | | |
|---|---|---|---|---|
| 6,173,317 | B1 | 1/2001 | Chaddha et al. | |
| 6,175,070 | B1 | 1/2001 | Naples et al. | |
| 6,180,863 | B1 | 1/2001 | Tamura | |
| 6,216,149 | B1 | 4/2001 | Conner et al. | |
| 6,225,546 | B1 | 5/2001 | Kraft et al. | |
| 6,233,389 | B1 | 5/2001 | Barton et al. | |
| 6,301,603 | B1 * | 10/2001 | Maher et al. | 718/105 |
| 6,357,039 | B1 * | 3/2002 | Kuper | 717/136 |
| 6,433,266 | B1 | 8/2002 | Fay et al. | |
| 6,541,689 | B1 | 4/2003 | Fay et al. | |
| 6,628,928 | B1 | 9/2003 | Crosby et al. | |
| 6,640,257 | B1 | 10/2003 | MacFarlane | |
| 6,658,309 | B1 * | 12/2003 | Abrams et al. | 700/94 |
| 2001/0053944 | A1 | 12/2001 | Marks et al. | |
| 2002/0108484 | A1 | 8/2002 | Arnold et al. | |
| 2002/0144587 | A1 | 10/2002 | Naples et al. | |
| 2002/0144588 | A1 | 10/2002 | Naples et al. | |

OTHER PUBLICATIONS

V. Ulianich, "Project FORMUS: Sonoric Space—Time and the Artistic Synthesis of Sound", Leonardo vol. 28, No. 1 pp. 63-66 (1995).

H. Meeks, "Sound Forge Version 4.0b", Social Science Computer Review vol. 16, No. 2 pp. 205-211 (Summer 1998).

R. Dannenberg et al., "Real-Time Software Synthesis on Superscalar Architectures", Computer Music Journal vol. 21, No. 3 pp. 83-94 (Fall 1997).

A. Camurri et al., "A Software Architecture for Sound and Music Processing", Microprocessing and Microprogramming vol. 35 pp. 625-632 (Sep. 1992).

R. Nieberle et al., "CAMP: Computer-Aided Music Processing", Computer Music Journal vol. 15, No. 2 pp. 33-40 (Summer 1991).

M. Cohen et al., "Multidimensional Audio Window Management", Int. J. Man-Machine Studies vol. 34, No. 3 pp. 319-336 (1991).

Malham et al., "3-D Sound Spatialization using Ambisonic Techniques" Computer Music Journal Winter 1995 vol. 19 No. 4 pp. 58-70.

Stanojevic et al., "The Total Surround Sound (TSS) Processor" SMPTE Journal Nov. 1994 vol. 3 No. 11 pp. 734-740.

Berry M., "An Introduction to GrainWave" Computer Music Journal Spring 1999 vol. 23 No. 1 pp. 57-61.

Meyer D., "Signal Processing Architecture for Loudspeaker Array Directivity Control" ICASSP Mar. 1985 vol. 2 pp. 16.7.1-16.7.4.

Reilly et al. , "Interactive DSP Debugging in the Multi-Processor Huron Environment" ISSPA Aug. 1996 pp. 270-273.

Miller et al.,"Audio-Enhanced Computer Assisted Learning and Computer Controlled Audio-Instruction", Computer Education, Pergamon Press Ltd., 1983, vol. 7, pp. 33-54.

Vercoe, et al; "Real-Time CSOUND: Software Synthesis with Sensing and Control"; ICMC Glasgow 1990 for the Computer Music Association; pp. 209 through 211.

Harris et al.; "The Application of Embedded Transputers in a Professional Digital Audio Mixing System"; IEEE Colloquium on "Transputer Applications"; Digest No. 129, 2/ 1-3 (uk Nov. 13, 1989).

Vercoe, Barry; "New Dimensions in Computer Music"; Trends & Perspectives in Signal Processing; Focus, Apr. 1982; pp. 15 through 23.

Moorer, James; "The Lucasfilm Audio Signal Processor"; Computer Music Journal, vol. 6, No. 3, Fall 1982, 0148-9267/82/030022-11; pp. 22 through 32.

Wippler, Jean-Claude; "Scripted Documents"; Proceedings of the 7th USENIX Tcl/TKConference; Austin Texas; Feb. 14-18, 2000; The USENIX Association.

Waid, Fred; "APL and the Media"; Proceedings of the Tenth APL as a Tool of Thought Conference; held at Stevens Institute of Technology, Hoboken, New Jersey, Jan. 31, 1998; pp. 111 through 122.

Bargen, et al., "Inside DirectX", Microsoft Press, 1998, pp. 203-266.

* cited by examiner

Background

AUDIO GENERATION SYSTEM MANAGER

RELATED APPLICATIONS

This application is related to a concurrently-filed U.S. patent application Ser. No. 09/802,111 entitled "Synthesizer Multi-Bus Component", to Fay et al., the disclosure of which is incorporated by reference herein.

This application is also related to a concurrently-filed U.S. patent application Ser. No. 09/801,938 entitled "Accessing Audio Processing Components in an Audio Generation System", to Fay et al., the disclosure of which is incorporated by reference herein.

This application is also related to a concurrently-filed U.S. patent application Ser. No. 09/802,323 entitled "Dynamic Channel Allocation in a Synthesizer Component", to Fay, the disclosure of which is incorporated by reference herein.

TECHNICAL FIELD

This invention relates to audio processing with an audio generation system and, in particular, to an audio rendition manager that manages audio renditions of sound effects and/or music pieces.

BACKGROUND

Multimedia programs present data to a user through both audio and video events while a user interacts with a program via a keyboard, joystick, or other interactive input device. A user associates elements and occurrences of a video presentation with the associated audio representation. A common implementation is to associate audio with movement of characters or objects in a video game. When a new character or object appears, the audio associated with that entity is incorporated into the overall presentation for a more dynamic representation of the video presentation.

Audio representation is an essential component of electronic and multimedia products such as computer based and stand-alone video games, computer-based slide show presentations, computer animation, and other similar products and applications. As a result, audio generating devices and components are integrated with electronic and multimedia products for composing and providing graphically associated audio representations. These audio representations can be dynamically generated and varied in response to various input parameters, real-time events, and conditions. Thus, a user can experience the sensation of live audio or musical accompaniment with a multimedia experience.

Conventionally, computer audio is produced in one of two fundamentally different ways. One way is to reproduce an audio waveform from a digital sample of an audio source which is typically stored in a wave file (i.e., a .wav file). A digital sample can reproduce any sound, and the output is very similar on all sound cards, or similar computer audio rendering devices. However, a file of digital samples consumes a substantial amount of memory and resources for streaming the audio content. As a result, the variety of audio samples that can be provided using this approach is limited. Another disadvantage of this approach is that the stored digital samples cannot be easily varied.

Another way to produce computer audio is to synthesize musical instrument sounds, typically in response to instructions in a Musical Instrument Digital Interface (MIDI) file. MIDI is a protocol for recording and playing back music and audio on digital synthesizers incorporated with computer sound cards. Rather than representing musical sound directly, MIDI transmits information and instructions about how music is produced. The MIDI command set includes note-on, note-off, key velocity, pitch bend, and other methods of controlling a synthesizer.

The audio sound waves produced with a synthesizer are those already stored in a wavetable in the receiving instrument or sound card. A wavetable is a table of stored sound waves that are digitized samples of actual recorded sound. A wavetable can be stored in read-only memory (ROM) on a sound card chip, or provided with software. Prestoring sound waveforms in a lookup table improves rendered audio quality and throughput. An advantage of MIDI files is that they are compact and require few audio streaming resources, but the output is limited to the number of instruments available in the designated General MIDI set and in the synthesizer, and may sound very different on different computer systems.

MIDI instructions sent from one device to another indicate actions to be taken by the controlled device, such as identifying a musical instrument (e.g., piano, flute, drums, etc.) for music generation, turning on a note, and/or altering a parameter in order to generate or control a sound. In this way, MIDI instructions control the generation of sound by remote instruments without the MIDI control instructions carrying sound or digitized information. A MIDI sequencer stores, edits, and coordinates the MIDI information and instructions. A synthesizer connected to a sequencer generates audio based on the MIDI information and instructions received from the sequencer. Many sounds and sound effects are a combination of multiple simple sounds generated in response to the MIDI instructions.

A MIDI system allows audio and music to be represented with only a few digital samples rather than converting an analog signal to many digital samples. The MIDI standard supports different channels that can each simultaneously provide an output of audio sound wave data. There are sixteen defined MIDI channels, meaning that no more than sixteen instruments can be playing at one time. Typically, the command input for each channel represents the notes corresponding to an instrument. However, MIDI instructions can program a channel to be a particular instrument. Once programmed, the note instructions for a channel will be played or recorded as the instrument for which the channel has been programmed. During a particular piece of music, a channel can be dynamically reprogrammed to be a different instrument.

A Downloadable Sounds (DLS) standard published by the MIDI Manufacturers Association allows wavetable synthesis to be based on digital samples of audio content provided at run time rather than stored in memory. The data describing an instrument can be downloaded to a synthesizer and then played like any other MIDI instrument. Because DLS data can be distributed as part of an application, developers can be sure that the audio content will be delivered uniformly on all computer systems. Moreover, developers are not limited in their choice of instruments.

A DLS instrument is created from one or more digital samples, typically representing single pitches, which are then modified by a synthesizer to create other pitches. Multiple samples are used to make an instrument sound realistic over a wide range of pitches. DLS instruments respond to MIDI instructions and commands just like other MIDI instruments. However, a DLS instrument does not have to belong to the General MIDI set or represent a musical instrument at all. Any sound, such as a fragment of speech or a fully composed measure of music, can be associated with a DLS instrument.

Conventional Audio and Music System

FIG. 1 illustrates a conventional audio and music generation system 100 that includes a synthesizer 102, a sound effects input source 104, and a buffers component 106. Typically, a synthesizer is implemented in computer software, in hardware as part of a computer's internal sound card, or as an external device such as a MIDI keyboard or module. The synthesizer 102 receives MIDI inputs on sixteen channels 108 that conform to the MIDI standard (only synthesizer channels 1, 2, and 10 are shown). The synthesizer 102 includes a mixing component 110 that mixes the audio sound wave data output from synthesizer channels 108. The output of mixing component 110 is input to an audio buffer in the buffers component 106.

MIDI inputs to a synthesizer 102 are in the form of individual instructions, each of which designates the channel to which it applies. Within the synthesizer 102, instructions associated with different channels 108 are processed in different ways, depending on the programming for the various channels. A MIDI input is typically a serial data stream that is parsed in the synthesizer into MIDI instructions and synthesizer control information. A MIDI command or instruction is represented as a data structure containing information about the sound effect or music piece such as the pitch, relative volume, duration, and the like.

A MIDI instruction, such as a "note-on", directs a synthesizer 102 to play a particular note, or notes, on a synthesizer channel 108 having a designated instrument. The General MIDI standard defines standard sounds that can be combined and mapped into the sixteen separate instrument and sound channels. A MIDI event on a synthesizer channel corresponds to a particular sound and can represent a keyboard key stroke, for example. The "note-on" MIDI instruction can be generated with a keyboard when a key is pressed and the "note-on" instruction is sent to synthesizer 102. When the key on the keyboard is released, a corresponding "note-off" instruction is sent to stop the generation of the sound corresponding to the keyboard key.

The audio representation in a video game involving a car, from the perspective of a person in the car, can be presented for an interactive video and audio presentation. The sound effects input source 104 has audio data that represents various sounds that a driver in a car might hear. A MIDI formatted music piece 112 represents the audio of the car's stereo. The input source 104 also has digital audio sample inputs that are sound effects representing the car's horn 114, the car's tires 116, and the car's engine 118.

The MIDI formatted input 112 has sound effect instructions 120(1-3) to generate musical instrument sounds. Instruction 120(1) designates that a guitar sound be generated on MIDI channel 1 in synthesizer 102, instruction 120(2) designates that a bass sound be generated on MIDI channel 2, and instruction 120(3) designates that drums be generated on MIDI channel 10. The MIDI channel assignments are designated when the MIDI input 112 is authored, or created.

A conventional software synthesizer that translates MIDI instructions into audio signals does not support distinctly separate sets of MIDI channels. The number of sounds that can be played simultaneously is limited by the number of channels and resources available in the synthesizer. In the event that there are more MIDI inputs than there are available channels and resources, one or more inputs are suppressed by the synthesizer.

The audio system 100 includes a buffers component 106 that has multiple buffers 122(1-4). Typically, a buffer is an allocated area of memory that temporarily holds sequential samples of audio sound wave data that will be subsequently delivered to a sound card or similar audio rendering device to produce audible sound. The output of the synthesizer mixing component 110 is input to one buffer 122(1) in the buffers component 106. Similarly, each of the other digital sample sources are input to a different buffer 122 in the buffers component 106. The car horn sound effect 114 is input to buffer 122(2), the tires sound effect 116 is input to buffer 122(3), and the engine sound effect 118 is input to buffer 122(4).

Another problem with conventional audio generation systems is the extent to which system resources have to be allocated to support an audio representation for a video presentation. In the above example, each buffer 122 requires separate hardware channels, such as in a soundcard, to render the audio sound effects from input source 104.

Similarly, other three-dimensional (3-D) spatialization effects are difficult to create and require an allocation of system resources that may not be available when processing a video game that requires an extensive audio presentation. For example, to represent more than one car from a perspective of standing near a road in a video game, a preauthored car engine sound effect 118 has to be stored in memory once for each car that will be represented. Additionally, a separate buffer 122 and separate hardware channels will need to be allocated for each representation of a car. If a computer that is processing the video game does not have the resources available to generate the audio representation that accompanies the video presentation, the quality of the presentation will be deficient.

SUMMARY

An audio generation system includes a performance manager, which is an audio source manager, and an audio rendition manager to produce a rendition corresponding to an audio source. An application program provides the performance manager and the audio rendition manager. The performance manager receives audio content from one or more audio sources and provides audio content components corresponding to each of the audio sources. The audio content components have tracks that generate event instructions from the received audio content, and the performance manager processes the event instructions to produce audio instructions. The performance manager provides, or routes, the audio instructions to the audio rendition manager.

The audio rendition manager provides processing components to process the audio instructions. A synthesizer component has one or more channel groups, and each channel group has synthesizer channels that receive the audio instructions and generate audio sound wave data. An audio buffers component has audio buffers that process the audio sound wave data.

A mapping component has mapping channels that correspond to the synthesizer channels. The mapping component receives the audio instructions from the performance manager, designates the synthesizer channels that receive the audio instructions via the respective mapping channels, and routes the audio instructions to the synthesizer channels.

A multi-bus component defines logical buses corresponding respectively to the audio buffers in the audio buffers component. The multi-bus component receives the audio wave data at the defined logical buses and routes the audio wave data received at a particular logical bus to the audio buffer corresponding to the particular logical bus.

An audio generation system can include more than one audio rendition manager to produce more than one rendition of an audio source. Additionally, an audio rendition manager can process audio instructions corresponding to more than one audio source. Furthermore, the processing components of an audio rendition manager can be utilized by more than one audio rendition manager.

BRIEF DESCRIPTION OF THE DRAWINGS

The same numbers are used throughout the drawings to reference like features and components.

DETAILED DESCRIPTION

The following describes systems and methods to implement an audio generation system that supports numerous computing systems' audio technologies, including technologies that are designed and implemented after an application program has been authored. An application program itself is not involved in the details of audio generation, but rather instantiates the components of an audio generation system to produce the audio.

An audio rendition manager is implemented to provide various audio data processing components that process audio data into audible sound. The audio generation system described herein simplifies the process of creating audio representations for interactive applications such as video games and Web sites. The audio rendition manager manages the audio creation process and integrates both digital audio samples and streaming audio.

Additionally, an audio rendition manager provides real-time, interactive control over the audio data processing for audio representations of video presentations. Audio rendition managers also enable 3-D audio spatialization processing for an individual audio representation of an entity's video presentation. Multiple audio renditions representing multiple video entities can be accomplished with an individual audio rendition manager representing each video entity, or audio renditions for multiple entities can be combined in a single audio rendition manager.

Real-time control of audio data processing components in an audio generation system is needed, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene. Additional information regarding real-time control of the audio data processing components described herein can be found in the concurrently-filed U.S. patent application entitled "Accessing Audio Processing Components in an Audio Generation System", which is incorporated by reference above.

Exemplary Audio Generation System

Figure 1:
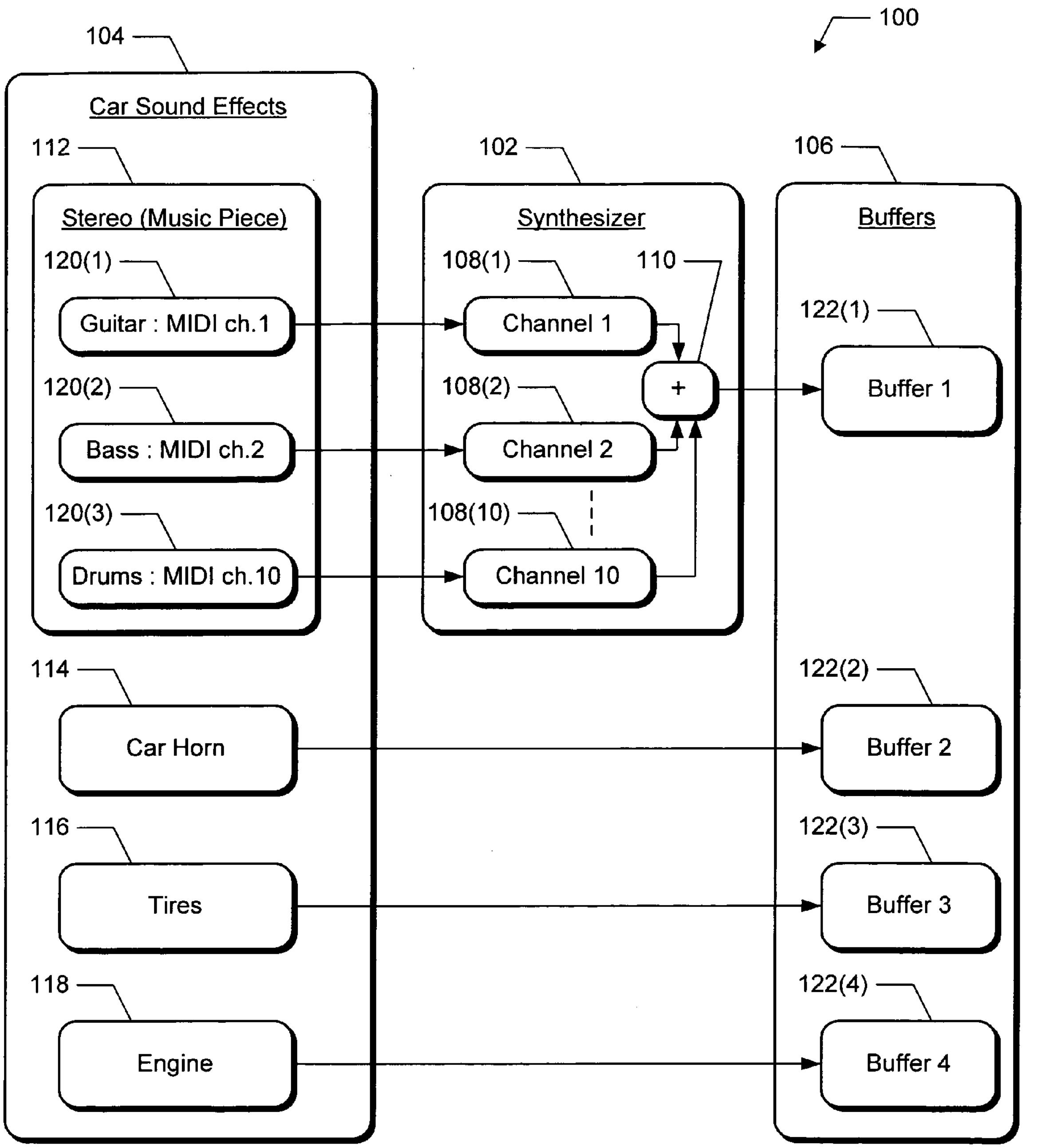
FIG. 1 is a block diagram that illustrates a conventional audio generation system.
Figure 2:
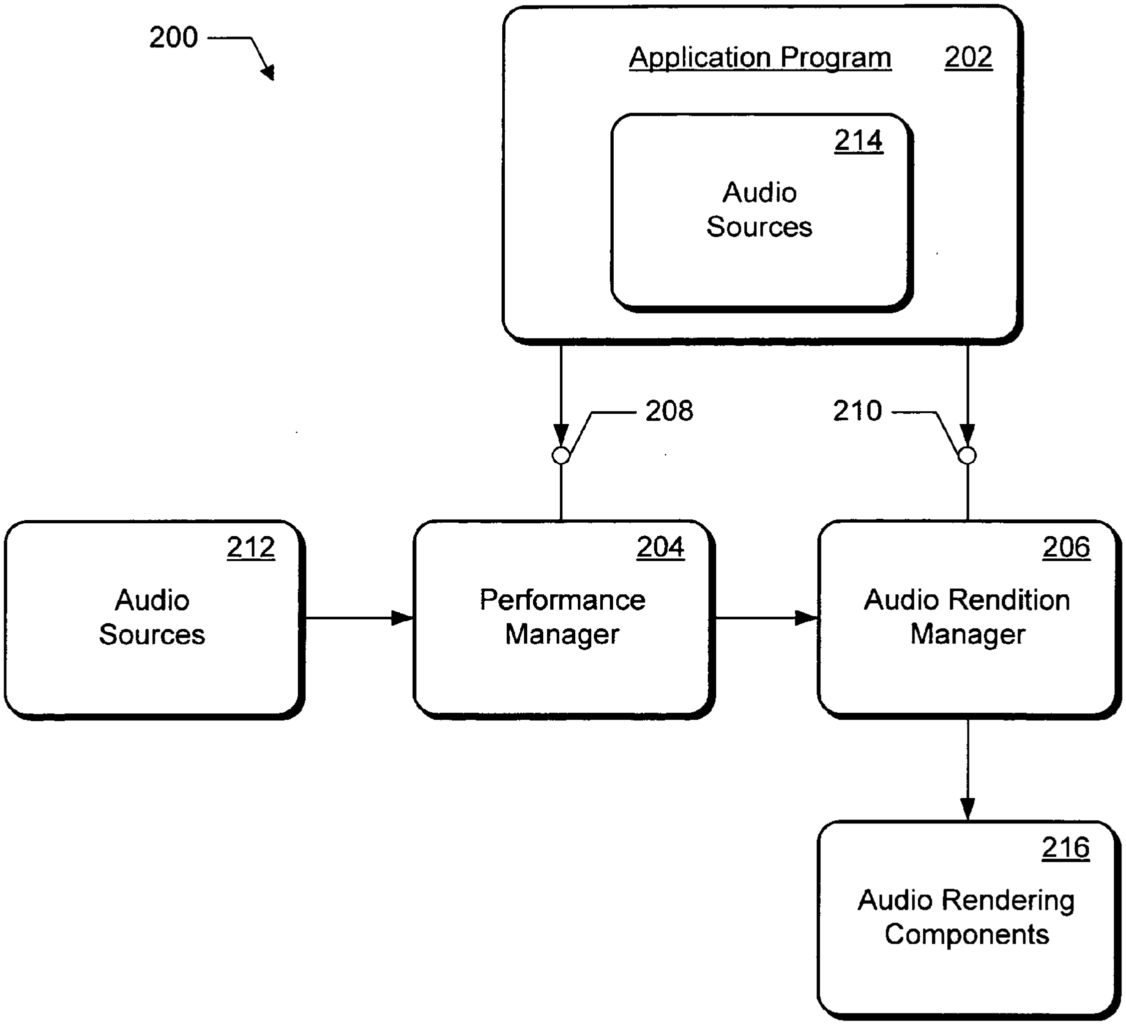
FIG. 2 is a block diagram that illustrates components of an exemplary audio generation system.

FIG. 2 illustrates an audio generation system 200 having components that can be implemented within a computing device, or the components can be distributed within a computing system having more than one computing device. The audio generation system 200 generates audio events that are processed and rendered by separate audio processing components of a computing device or system. See the description of "Exemplary Computing System and Environment" below for specific examples and implementations of network and computing systems, computing devices, and components that can be used to implement the technology described herein.

Audio generation system 200 includes an application program 202, a performance manager component 204, and an audio rendition manager 206. Application program 202 is one of a variety of different types of applications, such as a video game program, some other type of entertainment program, or any other application that incorporates an audio representation with a video presentation.

The performance manager 204 and the audio rendition manager 206 can be instantiated, or provided, as programming objects. The application program 202 interfaces with the performance manager 204, the audio rendition manager 206, and the other components of the audio generation system 200 via application programming interfaces (APIs). Specifically, application program 202 interfaces with the performance manager 204 via API 208 and with the audio rendition manager 206 via API 210.

The various components described herein, such as the performance manager 204 and the audio rendition manager 206, can be implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods can be called by application programs and by other objects. The interface methods of the objects are executed by a processing unit of the computing device. Familiarity with object-based programming, and with COM objects in particular, is assumed throughout this disclosure. However, those skilled in the art will recognize that the audio generation systems and the various components described herein are not limited to a COM and/or OLE implementation, or to any other specific programming technique.

The audio generation system 200 includes audio sources 212 that provide digital samples of audio data such as from a wave file (i.e., a .wav file), message-based data such as from a MIDI file or a pre-authored segment file, or an audio sample such as a Downloadable Sound (DLS). Audio sources can be also be stored as a resource component file of an application rather than in a separate file. For example, audio sources 214 are incorporated with application program 202.

Application program 202 initiates that an audio source 212 and/or 214 provide audio content input to the performance manager 204. The performance manager 204 receives the audio content from the audio sources 212 and/or 214 and produces audio instructions for input to the audio rendition manager 206. The audio rendition manager 206 receives the audio instructions and generates audio sound wave data. The audio generation system 200 includes audio rendering components 216 which are hardware and/or software components, such as a speaker or soundcard, that renders audio from the audio sound wave data received from the audio rendition manager 206.

Exemplary Audio Generation System

Figure 3:
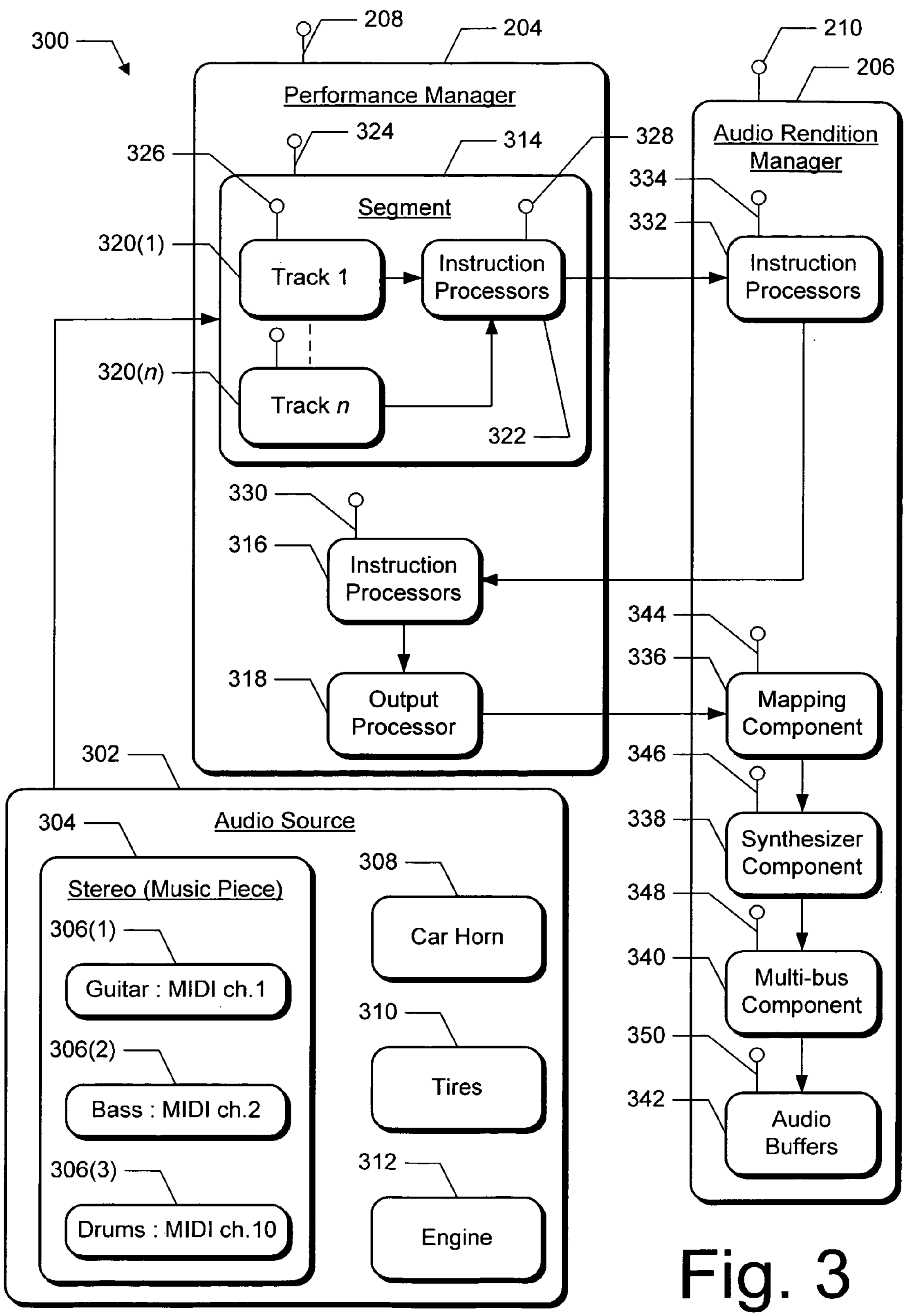
FIG. 3 is a block diagram that further illustrates components of the audio generation system shown in FIG. 2.

FIG. 3 illustrates a performance manager component 204 and an audio rendition manager 206 as part of an audio generation system 300. Additionally, an audio source 302 provides sound effects for an audio representation of various sounds that a driver of a car might hear in a video game, for example. The various sound effects can be presented to enhance the perspective of a person sitting in the car for an interactive video and audio presentation.

The audio source 302 has a MIDI formatted music piece 304 that represents the audio of a car stereo. The MIDI input 304 has sound effect instructions 306(1-3) to generate musical instrument sounds. Instruction 306(1) designates that a guitar sound be generated on MIDI channel 1 in a synthesizer component, instruction 306(2) designates that a bass sound be generated on MIDI channel 2, and instruction 306(3) designates that drums be generated on MIDI channel 10. The input source 302 also has digital audio sample inputs that represent a car horn sound effect 308, a tires sound effect 310, and an engine sound effect 312.

The performance manager 204 can receive audio content from a wave file (i.e., .wav file), a MIDI file, or a segment file authored with an audio production application, such as DirectMusic® Producer, for example. DirectMusic® Producer is an authoring tool for creating interactive audio content and is available from Microsoft Corporation, Redmond Wash. Additionally, the performance manager 204 can receive audio content that is composed at run-time from different audio content components.

The performance manager 204 receives the audio content input from audio source 302 and produces audio instructions for input to the audio rendition manager 206. Performance manager 204 includes a segment component 314, an instruction processors component 316, and an output processor 318. The segment component 314 represents the audio content input from audio source 302. Although the performance manager 204 is shown having only one segment 314, the performance manager can have a primary segment and any number of secondary segments. Multiple segments can be arranged concurrently and/or sequentially with the performance manager 204.

Segment component 314 can be instantiated, or provided, as a programming object having one or more interfaces 324 and associated interface methods. In the described embodiment, segment object 314 is an instantiation of a COM object class and represents an audio or musical piece. An audio segment represents a linear interval of audio data or a music piece and is derived from the inputs of an audio source which can be digital audio data, such as the engine sound effect 312 in audio source 302, or event-based data, such as the MIDI formatted input 304.

The segment component 314 has track components 320 (1-*n*) and an instruction processors component 322. A segment 314 can have any number of track components 320 and can combine different types of audio data in the segment with different track components. Each type of audio data corresponding to a particular segment is contained in a track component in the segment. An audio segment is generated from a combination of the tracks in the segment. Thus, segment 314 has a track 320 for each of the audio inputs from audio source 302.

Each segment object contains references to one or a plurality of track objects. Track components 320(1-n) can be instantiated, or provided, as programming objects having one or more interfaces 326 and associated interface methods. The track objects 320 are played together to render the audio and/or musical piece represented by the segment object 314 which is part of a larger overall performance. When first instantiated, a track object does not contain actual music or audio performance data (such as a MIDI instruction sequence). However, each track object has a stream input/output (I/O) interface method through which audio data is specified.

The track objects 320(1-n) generate event instructions for audio and music generation components when the performance manager 204 plays the segment 314. Audio data is routed through the components in the performance manager 204 in the form of event instructions which contain information about the timing and routing of the audio data. The event instructions are routed between and through the components in the performance manager 204 on designated performance channels. The performance channels are allocated as needed to accommodate any number of audio input sources and routing event instructions.

To play a particular audio or musical piece, performance manager 204 calls segment object 314 and specifies a time interval or duration within the musical segment. The segment object in turn calls the track play methods of each of its track objects 320, specifying the same time interval. The track objects respond by independently rendering event instructions at the specified interval. This is repeated, designating subsequent intervals, until the segment has finished its playback.

The event instructions generated by a track 320 in segment 314 are input to the instruction processors component 322 in the segment. The instruction processors component 322 can be instantiated, or provided, as a programming object having one or more interfaces 328 and associated interface methods. The instruction processors component 322 has any number of individual event instruction processors (not shown) and represents the concept of a graph that specifies the logical relationship of an individual event instruction processor to another in the instruction processors component. An instruction processor can modify an event instruction and pass it on, delete it, or send a new instruction.

The instruction processors component 316 in the performance manager 204 also processes, or modifies, the event instructions. The instruction processors component 316 can be instantiated, or provided, as a programming object having one or more interfaces 330 and associated interface methods. The event instructions are routed from the performance manager instruction processors component 316 to the output processor 318 which converts the event instructions to MIDI formatted audio instructions. The audio instructions are then routed to the audio rendition manager 206.

The audio rendition manager 206 processes audio data to produce one or more instances of a rendition corresponding to an audio source, or audio sources. That is, audio content from multiple sources can be processed and played on a single audio rendition manager 206 simultaneously. Rather than allocating buffer and hardware audio channels for each sound, an audio rendition manager 206 can be created to process multiple sounds from multiple sources.

For example, a rendition of the sound effects in audio source 302 can be processed with a single audio rendition manager 206 to produce an audio representation from a spatialization perspective of inside a car. Additionally, the audio rendition manager 206 dynamically allocates hardware channels (e.g., audio buffers to stream the audio wave data) as needed and can render more than one sound through a single hardware channel because multiple audio events are pre-mixed before being rendered via a hardware channel.

The audio rendition manager 206 has an instruction processors component 332 that receives event instructions from the output of the instruction processors component 322 in segment 314 in the performance manager 204. The instruction processors component 332 in the audio rendition manager 206 is also a graph of individual event instruction modifiers that process event instructions. Although not shown, the instruction processors component 332 can receive event instructions from any number of segment outputs. Additionally, the instruction processors component 332 can be instantiated, or provided, as a programming object having one or more interfaces 334 and associated interface methods.

The audio rendition manager 206 also includes several component objects that are logically related to process the audio instructions received from the output processor 318 of the performance manager 204. The audio rendition manager 206 has a mapping component 336, a synthesizer component 338, a multi-bus component 340, and an audio buffers component 342.

Mapping component 336 can be instantiated, or provided, as a programming object having one or more interfaces 344 and associated interface methods. The mapping component 336 maps the audio instructions received from the output processor 318 in the performance manager 204 to the synthesizer component 338. Although not shown, an audio rendition manager can have more than one synthesizer component. The mapping component 336 allows audio instructions from multiple sources (e.g., multiple performance channel outputs from the output processor 318) to be input to one or more synthesizer components 338 in the audio rendition manager 206.

The synthesizer component 338 can be instantiated, or provided, as a programming object having one or more interfaces 346 and associated interface methods. The synthesizer component 338 receives the audio instructions from the output processor 318 via the mapping component 336. The synthesizer component 338 generates audio sound wave data from stored wavetable data in accordance with the received MIDI formatted audio instructions. Audio instructions received by the audio rendition manager 206 that are already in the form of audio wave data are mapped through to the synthesizer component 338, but are not synthesized.

A segment component 314 that corresponds to audio content from a wave file is played by the performance manager 204 like any other segment. The audio data from a wave file is routed through the components of the performance manager 204 on designated performance channels and is routed to the audio rendition manager 206 along with the MIDI formatted audio instructions. Although the audio content from a wave file is not synthesized, it is routed through the synthesizer component 338 and can be processed by MIDI controllers in the synthesizer.

The multi-bus component 340 can be instantiated, or provided, as a programming object having one or more interfaces 348 and associated interface methods. The multi-bus component 340 routes the audio wave data from the synthesizer component 338 to the audio buffers component 342. The multi-bus component 340 is implemented to represent actual studio audio mixing. In a studio, various audio sources such as instruments, vocals, and the like (which can also be outputs of a synthesizer) are input to a multi-channel mixing board that then routes the audio through various effects (e.g., audio processors), and then mixes the audio into the two channels that are a stereo signal.

The audio buffers component 342 can be instantiated, or provided, as a programming object having one or more interfaces 350 and associated interface methods. The audio buffers component 342 receives the audio wave data from the synthesizer component 338 via the multi-bus component 340. Individual audio buffers, such as a hardware audio channel, in the audio buffers component 342 receive the audio wave data and stream the audio wave data in real-time to an audio rendering device, such as a sound card, that produces the rendition represented by the audio rendition manager 206 as audible sound.

Exemplary Audio Rendition Components

Figure 4:
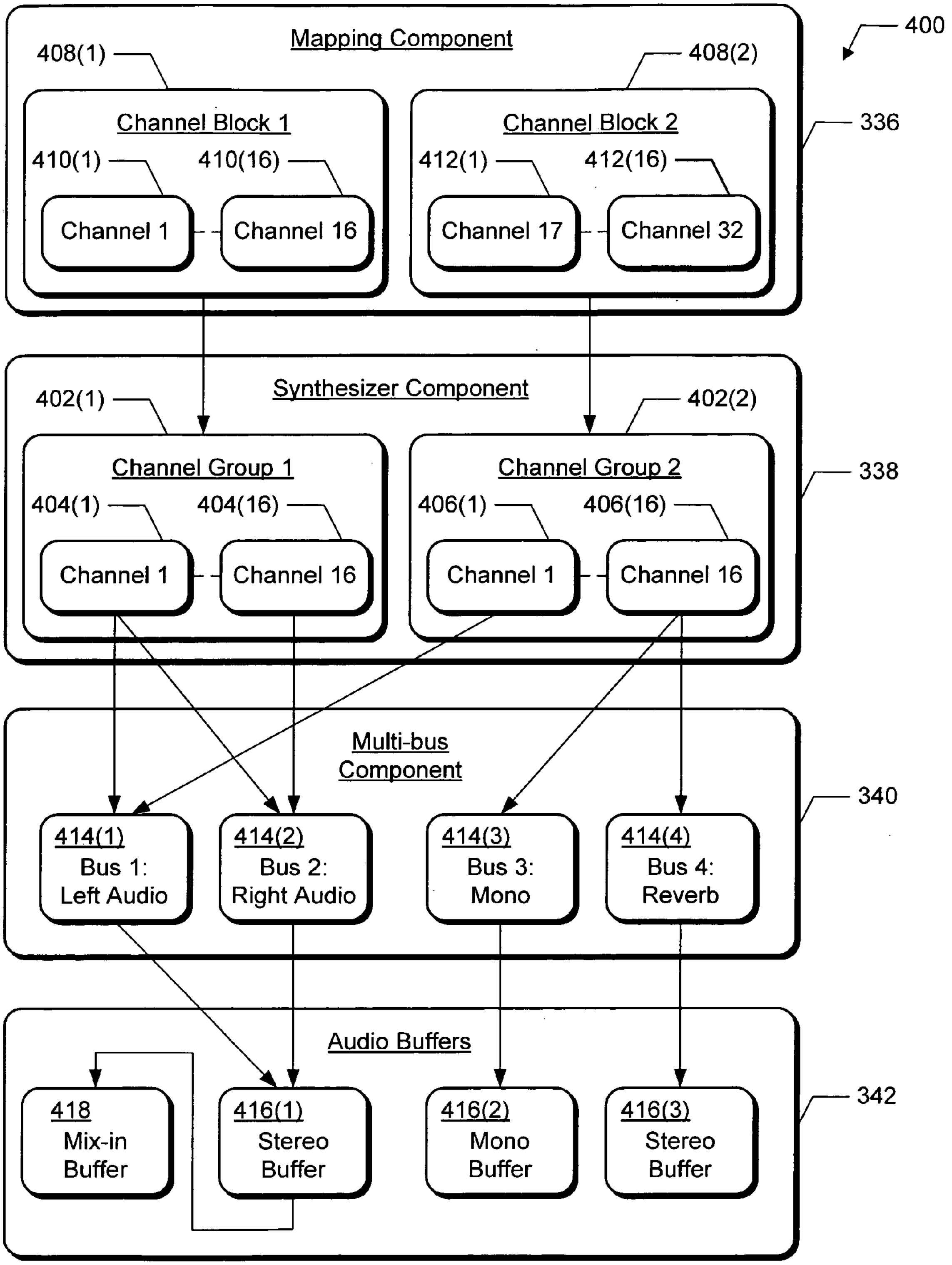
FIG. 4 is a block diagram that further illustrates components of the audio generation system shown in FIG. 3.

FIG. 4 illustrates a component relationship 400 of various audio data processing components in the audio rendition manager 206 in accordance with an implementation of the audio generation systems described herein. Details of the mapping component 336, synthesizer component 338, multi-bus component 340, and the audio buffers component 342 are illustrated, as well as a logical flow of audio data instructions through the components. Additional information regarding the audio data processing components described herein can be found in the concurrently-filed U.S. Patent Applications entitled "Dynamic Channel Allocation in a Synthesizer Component" and "Synthesizer Multi-Bus Component", both of which are incorporated by reference above.

The synthesizer component 338 has two channel groups 402(1) and 402(2), each having sixteen MIDI channels 404(1-16) and 406(1-16), respectively. Those skilled in the art will recognize that a group of sixteen MIDI channels can be identified as channels zero through fifteen (0-15). For consistency and explanation clarity, groups of sixteen MIDI channels described herein are designated in logical groups of one through sixteen (1-16). A synthesizer channel is a communications path in the synthesizer component 338 represented by a channel object. A channel object has APIs and associated interface methods to receive and process MIDI formatted audio instructions to generate audio wave data that is output by the synthesizer channels.

To support the MIDI standard, and at the same time make more MIDI channels available in a synthesizer to receive MIDI inputs, channel groups are dynamically created as needed. Up to 65,536 channel groups, each containing sixteen channels, can be created and can exist at any one time for a total of over one million channels in a synthesizer component. The MIDI channels are also dynamically allocated for one or more synthesizers to receive multiple audio instruction inputs. The multiple inputs can then be processed at the same time without channel overlapping and without channel clashing. For example, two MIDI input sources can have MIDI channel designations that designate the same MIDI channel, or channels. When audio instructions from one or more sources designate the same MIDI channel, or channels, the audio instructions are routed to a synthesizer channel 404 or 406 in different channel groups 402(1) or 402(2), respectively.

The mapping component 336 has two channel blocks 408(1) and 408(2), each having sixteen mapping channels to receive audio instructions from the output processor 318 in the performance manager 204. The first channel block 408(1) has sixteen mapping channels 410(1-16) and the second channel block 408(2) has sixteen mapping channels 412(1-16). The channel blocks 408 are dynamically created as needed to receive the audio instructions. The channel blocks 408 each have sixteen channels to support the MIDI standard and the mapping channels are identified sequentially. For example, the first channel block 408(1) has mapping channels 1-16 and the second channel block 408(2) has mapping channels 17-32. A subsequent third channel block would have sixteen mapping channels 33-48.

Each channel block 408 corresponds to a synthesizer channel group 402, and each mapping channel in a channel block maps directly to a synthesizer channel in the synthesizer channel group. For example, the first channel block 408(1) corresponds to the first channel group 402(1) in synthesizer component 338. Each mapping channel 410(1-16) in the first channel block 408(1) corresponds to each of the sixteen synthesizer channels 404(1-16) in channel group 402(1). Additionally, channel block 408(2) corresponds to the second channel group 402(2) in the synthesizer component 338. A third channel block can be created in the mapping component 336 to correspond to a first channel group in a second synthesizer component (not shown).

Mapping component 336 allows multiple audio instruction sources to share available synthesizer channels, and dynamically allocating synthesizer channels allows multiple source inputs at any one time. The mapping component 336 receives the audio instructions from the output processor 318 in the performance manager 204 so as to conserve system resources such that synthesizer channel groups are allocated only as needed. For example, the mapping component 336 can receive a first set of audio instructions on mapping channels 410 in the first channel block 408 that designate MIDI channels 1, 2, and 4 which are then routed to synthesizer channels 404(1), 404(2), and 404(4), respectively, in the first channel group 402(1).

When the mapping component 336 receives a second set of audio instructions that designate MIDI channels 1, 2, 3, and 10, the mapping component 336 routes the audio instructions to synthesizer channels 404 in the first channel group 402(1) that are not currently in use, and then to synthesizer channels 406 in the second channel group 402(2). That is, the audio instruction that designates MIDI channel 1 is routed to synthesizer channel 406(1) in the second channel group 402(2) because the first MIDI channel 404(1) in the first channel group 402(1) already has an input from the first set of audio instructions. Similarly, the audio instruction that designates MIDI channel 2 is routed to synthesizer channel 406(2) in the second channel group 402(2) because the second MIDI channel 404(2) in the first channel group 402(1) already has an input. The mapping component 336 routes the audio instruction that designates MIDI channel 3 to synthesizer channel 404(3) in the first channel group 402(1) because the channel is available and not currently in use. Similarly, the audio instruction that designates MIDI channel 10 is routed to synthesizer channel 404(10) in the first channel group 402(1).

When particular synthesizer channels are no longer needed to receive MIDI inputs, the resources allocated to create the synthesizer channels are released as well as the resources allocated to create the channel group containing the synthesizer channels. Similarly, when unused synthesizer channels are released, the resources allocated to create the channel block corresponding to the synthesizer channel group are released to conserve resources.

Multi-bus component 340 has multiple logical buses 414(1-4). A logical bus 414 is a logic connection or data communication path for audio wave data received from the synthesizer component 338. The logical buses 414 receive audio wave data from the synthesizer channels 404 and 406 and route the audio wave data to the audio buffers component 342. Although the multi-bus component 340 is shown having only four logical buses 414(1-4), it is to be appreciated that the logical buses are dynamically allocated as needed, and released when no longer needed. Thus, the multi-bus component 340 can support any number of logical buses at any one time as needed to route audio wave data from the synthesizer component 338 to the audio buffers component 342.

The audio buffers component 342 includes three buffers 416(1-3) that are consumers of the audio wave data output by the synthesizer component 338. The buffers 416 receive the audio wave data via the logical buses 414 in the multi-bus component 340. An audio buffer 416 receives an input of audio wave data from one or more logical buses 414, and streams the audio wave data in real-time to a sound card or similar audio rendering device. An audio buffer 416 can also process the audio wave data input with various effects-processing (i.e., audio data processing) components before sending the data to be further processed and/or rendered as audible sound. Although not shown, the effects processing components are created as part of a buffer 416 and a buffer can have one or more effects processing components that perform functions such as control pan, volume, 3-D spatialization, reverberation, echo, and the like.

The audio buffers component 342 includes three types of buffers. The input buffers 416 receive the audio wave data output by the synthesizer component 338. A mix-in buffer 418 receives data from any of the other buffers, can apply effects processing, and mix the resulting wave forms. For example, mix-in buffer 418 receives an input from input buffer 416(1). A mix-in buffer 418, or mix-in buffers, can be used to apply global effects processing to one or more outputs from the input buffers 416. The outputs of the input buffers 416 and the output of the mix-in buffer 418 are input to a primary buffer (not shown) that performs a final mixing of all of the buffer outputs before sending the audio wave data to an audio rendering device.

The audio buffers component 342 includes a two channel stereo buffer 416(1) that receives audio wave data input from logic buses 414(1) and 414(2), a single channel mono buffer 416(2) that receives audio wave data input from logic bus 414(3), and a single channel reverb stereo buffer 416(3) that receives audio wave data input from logic bus 414(4). Each logical bus 414 has a corresponding bus function identifier that indicates the designated effects-processing function of the particular buffer 416 that receives the audio wave data output from the logical bus. For example, a bus function identifier can indicate that the audio wave data output of a corresponding logical bus will be to a buffer 416 that functions as a left audio channel such as from bus 414(1), a right audio channel such as from bus 414(2), a mono channel such as from bus 414(3), or a reverb channel such as from bus 414(4). Additionally, a logical bus can output audio wave data to a buffer that functions as a three-dimensional (3-D) audio channel, or output audio wave data to other types of effects-processing buffers.

A logical bus 414 can have more than one input, from more than one synthesizer, synthesizer channel, and/or audio source. A synthesizer component 338 can mix audio wave data by routing one output from a synthesizer channel 404 and 406 to any number of logical buses 414 in the multi-bus component 340. For example, bus 414(1) has multiple inputs from the first synthesizer channels 404(1) and 406(1) in each of the channel groups 402(1) and 402(2), respectively. Each logical bus 414 outputs audio wave data to one associated buffer 416, but a particular buffer can have more than one input from different logical buses. For example, buses 414(1) and 414(2) output audio wave data to one designated buffer. The designated buffer 416(1), however, receives the audio wave data output from both buses.

Although the audio buffers component 342 is shown having only three input buffers 416(1-3) and one mix-in buffer 418, it is to be appreciated that there can be any number of audio buffers dynamically allocated as needed to receive audio wave data at any one time. Furthermore, although the multi-bus component 340 is shown as an independent component, it can be integrated with the synthesizer component 338, or the audio buffers component 342.

Exemplary Audio Generation System

Figure 5:
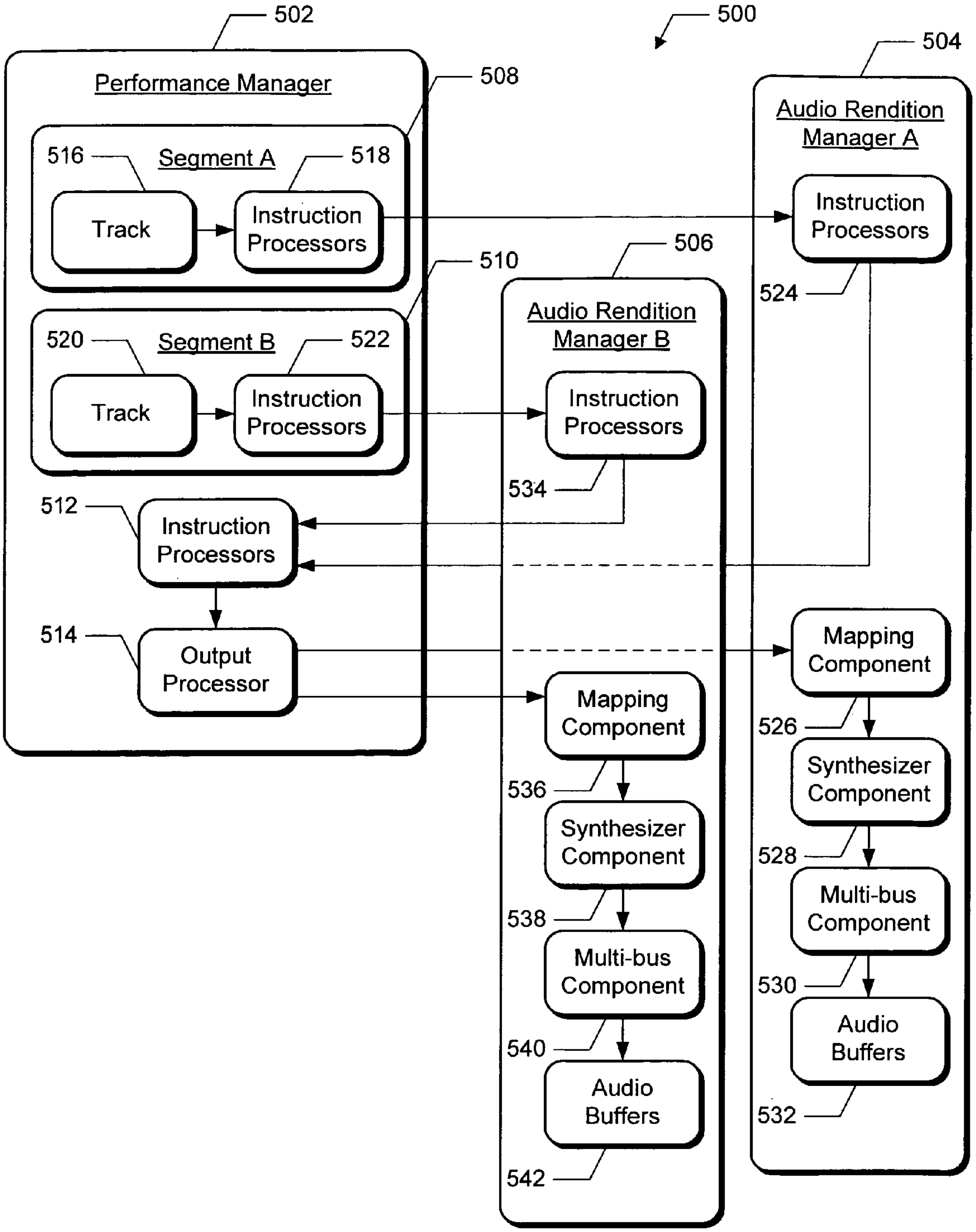
FIG. 5 is a block diagram that illustrates components of an exemplary audio generation system.

FIG. 5 illustrates an exemplary audio generation system 500 having a performance manager 502 and two audio rendition managers 504 and 506. The individual components illustrated in FIG. 5 are described above with reference to similar components shown in FIGS. 3 and 4. The performance manager 502 has a first segment component 508 and a second segment component 510, as well as an instruction processors component 512 and an output processor 514. Each of the segment components 508 and 510 represent audio content from an input source, such as audio source 302 (FIG. 3). Each segment component 508 and 510 has a track component 516 and 520, and an instruction processors component 518 and 522, respectively.

An audio generation system can instantiate an audio rendition manager corresponding to each segment in a performance manager. Additionally, multiple audio rendition managers can be instantiated corresponding to only one segment. That is, multiple instances of a rendition can be created from one segment (e.g., one audio source). In FIG. 5, audio rendition manager 504 corresponds to the first segment 508 and receives event instructions generated by track component 516. Audio rendition component 506 corresponds to the second segment 510 and receives event instructions generated by track component 520. Although not shown, audio rendition manager 504 can also receive event instructions generated by track component 520 in segment 510, and audio rendition manager 506 can also receive event instructions generated by track component 516 in segment 508.

Audio rendition component 504 has an instruction processors component 524, a mapping component 526, a synthesizer component 528, a multi-bus component 530, and an audio buffers component 532. Audio rendition component 506 has an instruction processors component 534, a mapping component 536, a synthesizer component 538, a multi-bus component 540, and an audio buffers component 542. Although not shown, either audio rendition manager 504 and 506 can share components with the other to conserve system resources. For example, audio buffers allocated in the audio buffer component of one audio rendition manager can be used to mix audio data from another audio rendition manager.

The track component 516 in the first segment 508 generates event instructions that are routed to the instruction processors component 524 in the first audio rendition manager 504. The track component 520 in the second segment 510 generates event instructions that are routed to the instruction processors component 534 in the second audio rendition manager 506. The event instruction outputs of both the instruction processors components 524 and 534 are routed to the instruction processors component 512 in the performance manager 502.

The event instructions from both audio rendition managers 504 and 506 are then routed from the instruction processors component 512 in the performance manager 502 to the output processor 514 where the event instructions are converted to audio instructions for input to the respective audio rendition managers. As described above with respect to FIG. 3, the event instructions are routed through and between the components in the performance manager 502 on designated performance channels which are allocated as needed to accommodate any number event instructions.

In addition to providing an audio rendition manager to process multiple sounds as described above with reference to FIG. 3, an audio rendition manager can be provided for each instance of a rendition corresponding to an audio source. For example, to create audio representations for two people sitting in a car, both of the audio rendition managers 504 and 506 can be created to generate a rendition of the sound effects in audio source 302 (FIG. 3). Each audio rendition manager would then represent the perspective of one of the people sitting in the car. Those skilled in the art will recognize that each persons perspective of the various sounds will be different according to a particular persons position in the car and relation to the other person in the car. An audio representation of each persons' perspective can be created with different 3-D audio spatialization processing effects in the independent audio rendition managers.

Another example of implementing multiple audio rendition managers is to represent multiple cars with car engine sound effects to create an audio representation of the multiple cars passing a person at a fixed position. The perspective in a video game, for example, can be created with each audio rendition manager representing a rendition of a car. Each audio rendition manager can receive the information for the car engine sound effect from one segment in a performance manager.

File Format and Component Instantiation

Figure 6:
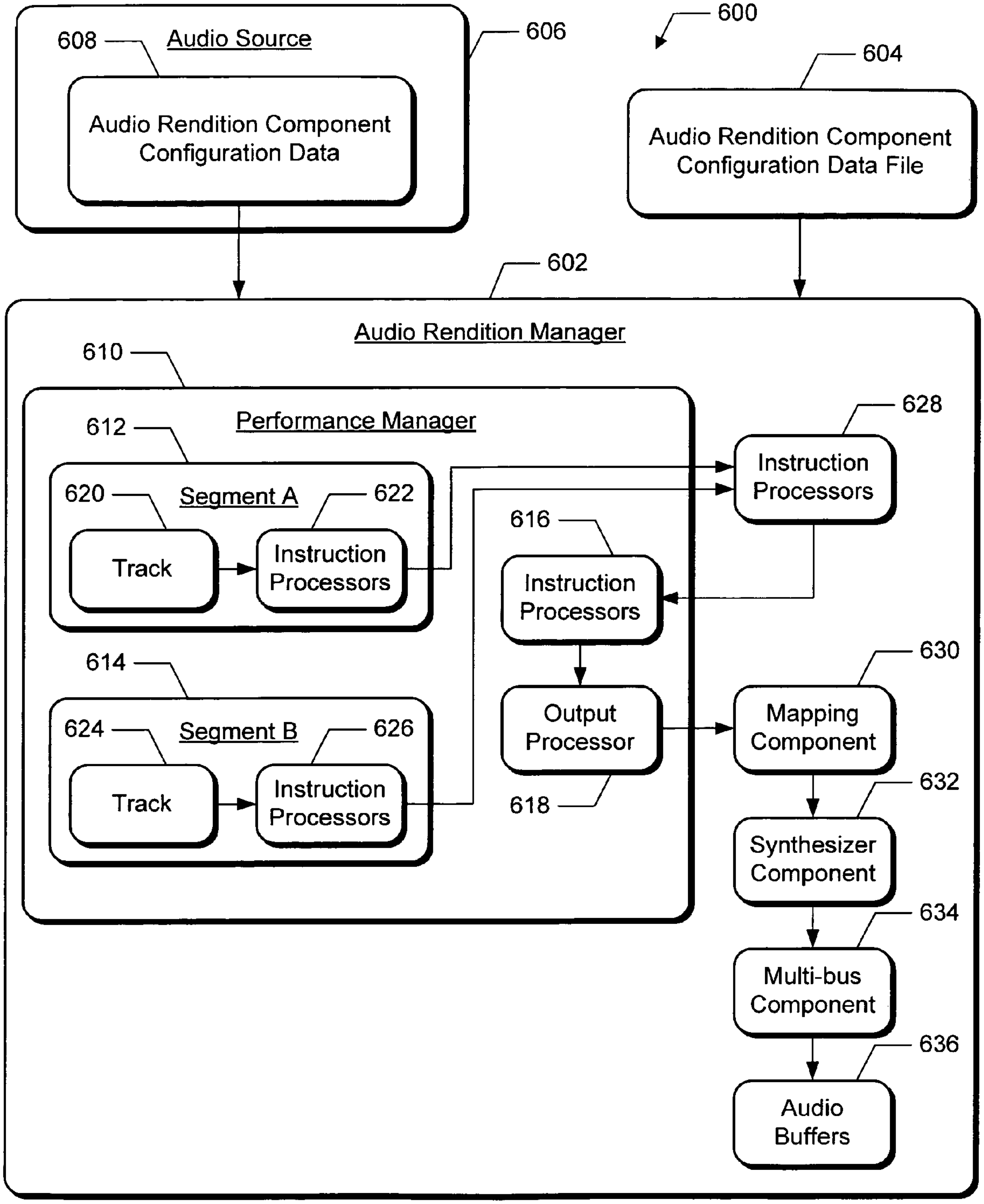
FIG. 6 is a block diagram that illustrates components of an exemplary audio generation system.

FIG. 6 illustrates an exemplary audio generation system 600 including an audio rendition manager 602, an audio rendition manager configuration data file 604, and an audio source 606 having incorporated audio rendition manager configuration data 608. The individual components illustrated in the audio rendition manager 602 are described above with reference to similar components shown in FIGS. 3 and 4.

In audio generation system 600, the audio rendition manager 602 includes a performance manager 610. Thus, an application program need only instantiate an audio rendition manager, which in turn provides the various audio data processing components, including a performance manager. The performance manager 610 has a first segment component 612 and a second segment component 614, as well as an instruction processors component 616 and an output processor 618. Each segment component 612 and 614 has a track component 620 and 624, and an instruction processors component 622 and 626, respectively. The audio rendition manager 602 also includes an instruction processors component 628, a mapping component 630, a synthesizer component 632, a multi-bus component 634, and an audio buffers component 636.

Audio sources and audio generation systems having audio rendition managers can be pre-authored which makes it easy to develop complicated audio representations and generate music and sound effects without having to create and incorporate specific programming code for each instance of an audio rendition of a particular audio source. FIG. 6 illustrates that an audio rendition manager 602 and the associated audio data processing components can be instantiated from an audio rendition manager configuration data file 604.

Alternatively, a segment data file, such as audio source 606, can contain audio rendition manager configuration data

608 within its file format representation to instantiate an audio rendition manager 602. When a segment 612, for example, is loaded from the segment data file 606, an audio rendition manager 602 is created. Upon playback, the audio rendition manager 602 defined by the configuration data 608 is automatically created and assigned to segment 612. When the audio corresponding to segment 612 is rendered, it releases the system resources allocated to instantiate the audio rendition manager 602 and the associated components.

Configuration information for an audio rendition manager object and the associated component objects is stored in a file format such as the Resource Interchange File Format (RIFF). A RIFF file includes a file header that contains data describing the object followed by what are known as "chunks." Each of the chunks following a file header corresponds to a data item that describes the object, and each chunk consists of a chunk header followed by actual chunk data. A chunk header specifies an object class identifier (CLSID) that can be used for creating an instance of the object. Chunk data consists of the data to define the corresponding data item. Those skilled in the art will recognize that an extensible markup language (XML) or other hierarchical file format can be used to implement the component objects and the audio generation systems described herein.

A RIFF file for a mapping component and a synthesizer component has configuration information that includes identifying the synthesizer technology designated by source input audio instructions. An audio source can be designed to play on more than one synthesis technology. For example, a hardware synthesizer can be designated by some audio instructions from a particular source, for performing certain musical instruments for example, while a wavetable synthesizer in software can be designated by the remaining audio instructions for the source.

The configuration information defines the synthesizer channels and includes both a synthesizer channel-to-buffer assignment list and a buffer configuration list stored in the synthesizer configuration data. The synthesizer channel-to-buffer assignment list defines the synthesizer channel sets and the buffers that are designated as the destination for audio wave data output from the synthesizer channels in the channel group. The assignment list associates buffers according to buffer global unique identifiers (GUIDs) which are defined in the buffer configuration list.

Defining the buffers by buffer GUIDs facilitates the synthesizer channel-to-buffer assignments to identify which buffer will receive audio wave data from a synthesizer channel. Defining buffers by buffer GUIDs also facilitates sharing resources. More than one synthesizer can output audio wave data to the same buffer. When a buffer is instantiated for use by a first synthesizer, a second synthesizer can output audio wave data to the buffer if it is available to receive data input. The buffer configuration list also maintains flag indicators that indicate whether a particular buffer can be a shared resource or not.

The configuration information also includes identifying whether a synthesizer channel ten will be designated as a drums channel. Typically, MIDI devices such as a synthesizer designates MIDI channel ten for drum instruments that map to it. However, some MIDI devices do not. The mapping component identifies whether a synthesizer channel ten in a particular channel group will be designated for drum instruments when instantiated. The configuration information also includes a configuration list that contains the information to allocate and map audio instruction input channels to synthesizer channels.

The RIFF file also has configuration information for a multi-bus component and an audio buffers component that includes data describing an audio buffer object in terms of a buffer GUID, a buffer descriptor, the buffer function and associated effects (i.e., audio processors), and corresponding logical bus identifiers. The buffer GUID uniquely identifies each buffer. A buffer GUID can be used to determine which synthesizer channels connect to which buffers. By using a unique buffer GUID for each buffer, different synthesizer channels, and channels from different synthesizers, can connect to the same buffer or uniquely different ones, whichever is preferred.

The instruction processors, mapping, synthesizer, multi-bus, and audio buffers component configurations support COM interfaces for reading and loading the configuration data from a file. To instantiate the components, an application program instantiates a component using a COM function. The components of the audio generation systems described herein are implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

The application program then calls a load method for the object and specifies a RIFF file stream. The object parses the RIFF file stream and extracts header information. When it reads individual chunks, it creates the object components, such as synthesizer channel group objects and corresponding synthesizer channel objects, and mapping channel blocks and corresponding mapping channel objects, based on the chunk header information.

Methods Pertaining to an Exemplary Audio Generation System

Although the invention has been described above primarily in terms of its components and their characteristics, the invention also includes methods performed by a computer or similar device to implement the features described above.

Figure 7:
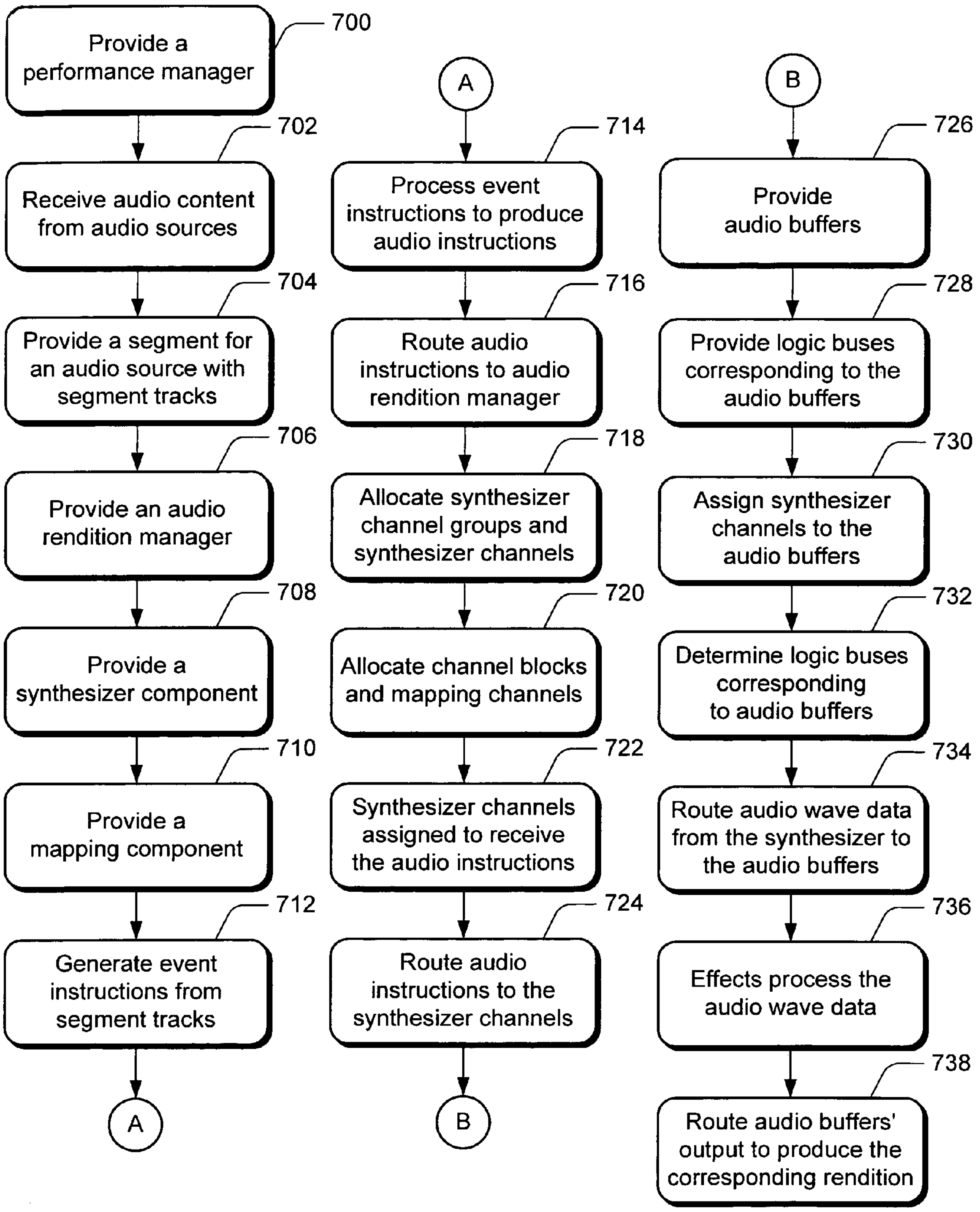
FIG. 7 is a flow diagram of a method for an audio generation system.

FIG. 7 illustrates a method for implementing the invention described herein. The order in which the method is described is not intended to be construed as a limitation. Furthermore, the method can be implemented in any suitable hardware, software, firmware, or combination thereof.

At block 700, a performance manager component is provided. The performance manager can be provided by an application program as part of an audio generation system that produces an audio representation to correlate with a video presentation. Furthermore, the performance manager can be provided as a programming object having an interface and interface methods that are callable by a software component. At block 702, audio content is received from one or more audio sources. The audio sources provide digital samples of audio data such as from a wave file, message-based data such as from a MIDI file or a pre-authored segment file, or an audio sample such as a Downloadable Sound (DLS).

At block 704, a segment having segment tracks is provided and corresponds to an audio source from which audio content is received. The segment can be provided as a programming object having an interface and interface methods that are callable by a software component. The segment component can be created from a file representation that is loaded and stored in a segment configuration object that maintains the configuration information. Additionally, the segment can be instantiated in the performance manager.

At block 706, an audio rendition manager is provided. The audio rendition manager can be provided by an application program or by the performance manager as part of an audio generation system that produces an audio representation to correlate with a video presentation. The audio rendition manager can be provided as a programming object having an interface and interface methods that are callable by a software component. Additionally, the audio rendition manager can be created from a file representation that is loaded and stored in a audio rendition manager configuration object that maintains the configuration information.

At block 708, a synthesizer component is provided. The synthesizer component can be provided as a programming object having an interface and interface methods that are callable by a software component to receive audio instructions. The synthesizer component can also be created from a file representation that is loaded and stored in a synthesizer configuration object that maintains the synthesizer configuration information.

At block 710, a mapping component is provided. The mapping component can be provided as a programming object having an interface and interface methods that are callable by a software component to route audio instructions to the synthesizer component. The mapping component can also be created from a file representation that is loaded and stored in a configuration object that maintains configuration information for a mapping component.

At block 712, the segment tracks generate event instructions when the performance manager calls the segment which in turn calls the segment tracks. At block 714, the performance manager processes the event instructions to produce audio instructions, such as MIDI formatted instructions.

At block 716, the audio rendition manager receives the audio instructions from the program manager. The audio instructions have instruction channel designations to indicate a routing destination for the audio instructions. For example, the audio instructions can be MIDI instructions that have MIDI channel designations.

At block 718, synthesizer channel groups are dynamically allocated for the synthesizer component, and each channel group has sixteen synthesizer channels. The synthesizer channel groups are allocated as needed to receive the audio instructions. If the audio instructions have instruction channel designations that designate the same instruction channel, additional channel groups and synthesizer channels are allocated to receive the audio instructions on different synthesizer channels.

At block 720, channel blocks are dynamically allocated in the mapping component, and each channel block has sixteen mapping channels. The channel blocks are allocated as needed and correspond to the synthesizer channel groups. A mapping channel in a channel block corresponds to a synthesizer channel in a synthesizer channel group.

At block 722, synthesizer channels are assigned to receive the audio instructions corresponding to the respective instruction channel designations. The audio instructions that designate the same instruction channel are assigned to different synthesizer channels. At block 724, the audio instructions are routed to the synthesizer channels in accordance with the instruction channel designations of the audio instructions and the synthesizer channel assignments. The audio instructions are routed to the synthesizer channels via the corresponding mapping channels in the mapping component.

At block 726, an audio buffers component is provided having audio buffers that receive audio sound wave data produced by the synthesizer component. The audio buffers component and the audio buffers can be provided as programming objects having an interface and interface methods that are callable by a software component. The audio buffers component and the audio buffers can also be created from a file representation that is loaded and stored in a buffer configuration object that maintains configuration information for an audio buffers component and for audio buffers.

At block 728, a multi-bus component is provided having logic buses corresponding to the audio buffers. The multi-bus component can be provided as a programming object having an interface and interface methods that are callable by a software component. At block 730, the synthesizer channels are assigned to the audio buffers according to which of the audio buffers the audio sound wave data will be routed to from the synthesizer channels. At block 732, the logic buses corresponding to each audio buffer that has been assigned to receive the audio sound wave data from a particular synthesizer channel is determined.

At block 734, the audio sound wave data is routed from the synthesizer component to the audio buffers in the audio buffers component via the logic buses in the multi-bus component. At block 736, the audio sound wave data received by the audio buffers is effects processed by audio effects processors in the audio buffers. At block 738, the output of the audio buffers is routed to an external device to produce an audible rendition corresponding to the audio data processed by the various components in the audio rendition manager.

Audio Generation System Component Interfaces and Methods

Embodiments of the invention are described herein with emphasis on the functionality and interaction of the various components and objects. The following sections describe specific interfaces and interface methods that are supported by the various objects.

A Loader interface (IDirectMusicLoader8) is an object that gets other objects and loads audio rendition manager configuration information. It is generally one of the first objects created in a DirectX® audio application. DirectX® is an API available from Microsoft Corporation, Redmond Wash. The loader interface supports a LoadObjectFromFile method that is called to load all audio content, including DirectMusic® segment files, DLS (downloadable sounds) collections, MIDI files, and both mono and stereo wave files. It can also load data stored in resources. Component objects are loaded from a file or resource and incorporated into a performance. The Loader interface is used to manage the enumeration and loading of the objects, as well as to cache them so that they are not loaded more than once.

Audio Rendition Manager Interface and Methods

An AudioPath interface (IDirectMusicAudioPath8) represents the routing of audio data from a performance component to the various component objects that comprise an audio rendition manager. The AudioPath interface includes the following methods:

An Activate method is called to specify whether to activate or deactivate an audio rendition manager. The method accepts Boolean parameters that specify "TRUE" to activate, or "FALSE" to deactivate.

A ConvertPChannel method translates between an audio data channel in a segment component and the equivalent performance channel allocated in a performance manager for an audio rendition manager. The method accepts a value that specifies the audio data channel in the segment component, and an address of a variable that receives a designation of the performance channel.

A GetObjectInPath method allows an application program to retrieve an interface for a component object in an audio rendition manager. The method accepts parameters that specify a performance channel to search, a representative location for the requested object in the logical path of the audio rendition manager, a CLSID (object class identifier), an index of the requested object within a list of matching objects, an identifier that specifies the requested interface of the object, and the address of a variable that receives a pointer to the requested interface.

A SetVolume method is called to set the audio volume on an audio rendition manager. The method accepts parameters that specify the attenuation level and a time over which the volume change takes place.

Performance Manager Interface and Methods

A Performance interface (IDirectMusicPerformance8) represents a performance manager and the overall management of audio and music playback. The interface is used to add and remove synthesizers, map performance channels to synthesizers, play segments, dispatch event instructions and route them through event instructions, set audio parameters, and the like. The Performance interface includes the following methods:

A CreateAudioPath method is called to create an audio rendition manager object. The method accepts parameters that specify an address of an interface that represents the audio rendition manager configuration data, a Boolean value that specifies whether to activate the audio rendition manager when instantiated, and the address of a variable that receives an interface pointer for the audio rendition manager.

A CreateStandardAudioPath method allows an application program to instantiate predefined audio rendition managers rather than one defined in a source file. The method accepts parameters that specify the type of audio rendition manager to instantiate, the number of performance channels for audio data, a Boolean value that specifies whether to activate the audio rendition manager when instantiated, and the address of a variable that receives an interface pointer for the audio rendition manager.

A PlaySegmentEx method is called to play an instance of a segment on an audio rendition manager. The method accepts parameters that specify a particular segment to play, various flags, and an indication of when the segment instance should start playing. The flags indicate details about how the segment should relate to other segments and whether the segment should start immediately after the specified time or only on a specified type of time boundary. The method returns a memory pointer to the state object that is subsequently instantiated as a result of calling PlaySegmenEx.

A StopEx method is called to stop the playback of audio on an component object in an audio generation system, such as a segment or an audio rendition manager. The method accepts parameters that specify a pointer to an interface of the object to stop, a time at which to stop the object, and various flags that indicate whether the segment should be stopped on a specified type of time boundary.

Segment Component Interface and Methods

A Segment interface (IDirectMusicSegment8) represents a segment in a performance manager which is comprised of multiple tracks. The Segment interface includes the following methods:

A Download method to download audio data to a performance manager or to an audio rendition manager. The term "download" indicates reading audio data from a source into memory. The method accepts a parameter that specifies a pointer to an interface of the performance manager or audio rendition manager that receives the audio data.

An Unload method to unload audio data from a performance manager or an audio rendition manager. The term "unload" indicates releasing audio data memory back to the system resources. The method accepts a parameter that specifies a pointer to an interface of the performance manager or audio rendition manager.

A GetAudioPathConfig method retrieves an object that represents audio rendition manager configuration data embedded in a segment. The object retrieved can be passed to the CreateAudioPath method described above. The method accepts a parameter that specifies the address of a variable that receives a pointer to the interface of the audio rendition manager configuration object.

Exemplary Computing System and Environment

Figure 8:
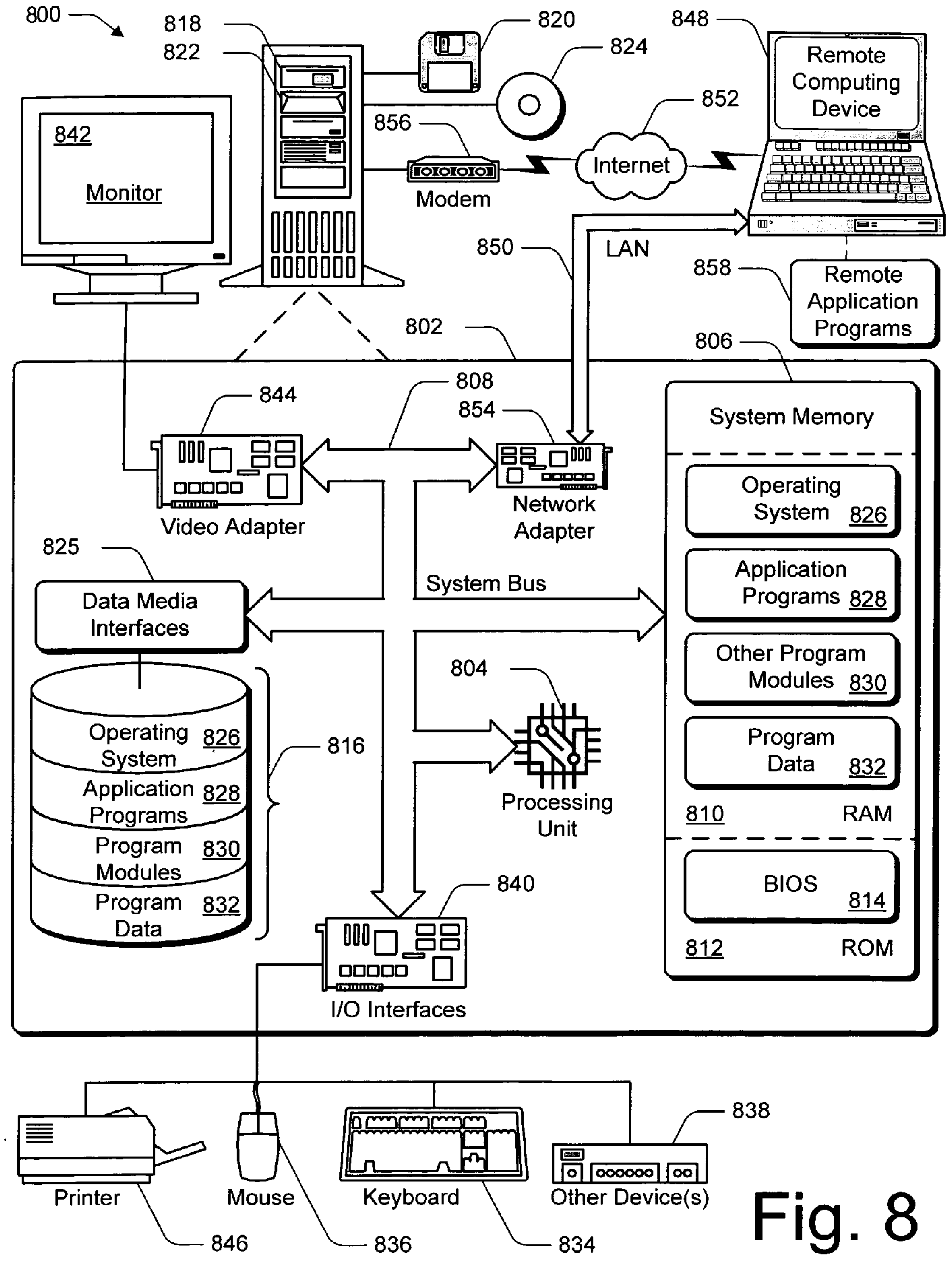
FIG. 8 is a diagram of computing systems, devices, and components in an environment that can be used to implement the invention described herein.

FIG. 8 illustrates an example of a computing environment 800 within which the computer, network, and system architectures described herein can be either fully or partially implemented. Exemplary computing environment 800 is only one example of a computing system and is not intended to suggest any limitation as to the scope of use or functionality of the network architectures. Neither should the computing environment 800 be interpreted as having any dependency or requirement relating to any one or combination of components illustrated in the exemplary computing environment 800.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The audio generation systems may be described in the general context of computer-executable instructions, such as program modules, being executed by a computer. Generally, program modules include routines, programs, objects, components, data structures, etc. that perform particular tasks or implement particular abstract data types. The audio generation systems may also be practiced in distributed computing environments where tasks are performed by remote processing devices that are linked through a communications network. In a distributed computing environment, program modules may be located in both local and remote computer storage media including memory storage devices.

The computing environment 800 includes a general-purpose computing system in the form of a computer 802. The components of computer 802 can include, by are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of an audio generation system.

Computer system 802 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 604 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

CONCLUSION

An audio generation system implemented with audio rendition managers is a flexible and adaptive system. An application program itself is not involved in the details of audio generation, but rather instantiates the components of an audio generation system to produce the audio. Thus, a single application program can support numerous computing systems' audio technologies, including technologies that are designed and implemented after the application program has been authored. An audio rendition manager allows an application program to have realtime interactive control over the audio data processing for audio representations of video presentations. Additionally, multiple audio renditions representing multiple video entities can be accomplished with an individual audio rendition manager representing each video entity, or audio renditions for multiple entities can be combined in a single audio rendition manager.

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method, comprising:

receiving audio content from one or more sources;

providing an audio content component for each source of audio content, each audio content component generating event instructions from the received audio content;

processing the event instructions to produce audio instructions;

dynamically generating audio rendition managers that each correspond to an audio rendition, an audio rendition manager including dynamically allocated components that include a synthesizer component, audio buffers, and logical buses that each correspond to one of the audio buffers;

routing the audio instructions to the audio rendition managers that process the audio instructions to render the corresponding audio renditions;

processing the audio instructions with the synthesizer component to generate multiple streams of audio wave data;

assigning at least one of the multiple streams of audio wave data to more than one of the logical buses where the logical buses receive the at least one stream of audio wave data from the synthesizer component; and routing audio wave data streams assigned to a particular logical bus to the audio buffer corresponding to said particular logical bus.

2. A method as recited in claim 1, wherein each audio content component is a component object having an interface that is callable by a software component, the software component directing said generating the event instructions.

3. A method as recited in claim 1, wherein each audio rendition manager is a component object having an interface that is callable by a software component, the software component performing said routing the audio instructions to the audio rendition managers.

4. A method as recited in claim 1, further comprising providing a software component, wherein each audio content component is a component object having an interface that is callable by the software component, the software component directing said generating the event instructions, and wherein each audio rendition manager is a component object having an interface that is callable by the software component, the software component performing said routing the audio instructions to the one or more audio rendition managers.

5. A method as recited in claim 1, further comprising dynamically a performance manager that performs said providing an audio content component for each source of audio content, and performs said dynamically generating the audio rendition managers that each correspond to an audio rendition.

6. A method as recited in claim 1, the method further comprising dynamically generating a performance manager as a component object that performs said providing an audio content component for each source of audio content, and performs said dynamically generating the audio rendition managers.

7. A method as recited in claim 1, further comprising dynamically generating a performance manager as a component object, wherein each audio content component is a component object having an interface that is callable by the performance manager, the performance manager directing said generating the event instructions, and wherein each audio rendition manager is a component object having an interface that is callable by the performance manager, the performance manager performing said routing the audio instructions to the audio rendition managers.

8. One or more computer-readable media comprising computer-executable instructions that, when executed, direct a computing system to perform the method of claim 7.

9. A method as recited in claim 1, further comprising dynamically generating a performance manager that performs said receiving the audio content, providing an audio content component for each source of audio content, processing the event instructions, and routing the audio instructions.

10. A method as recited in claim 1, further comprising providing a performance manager that performs said receiving the audio content, providing an audio content component for each source of audio content, processing the event instructions, dynamically generating the audio rendition managers, and routing the audio instructions.

11. A method as recited in claim 1, wherein the audio content includes digital audio samples.

12. A method as recited in claim 1, wherein the audio content includes MIDI data.

13. A method as recited in claim 1, wherein each audio content component has one or more event instruction components that perform said generating the event instructions.

14. A method as recited in claim 1, wherein each audio content component has one or more event instruction components that perform said generating the event instructions, each event instruction component corresponding to part of the received audio content.

15. A method as recited in claim 1, further comprising each audio content component generating event instructions and routing the event instructions to the audio rendition managers before said processing the event instructions.

16. A method as recited in claim 1, wherein the audio rendition managers receive audio instructions originating as event instructions from one or more of the audio content components.

17. A method as recited in claim 1, wherein one audio rendition manager receives audio instructions originating as event instructions from one or more of the audio content components.

18. A method as recited in claim 1, wherein the synthesizer component includes multiple channel groups, each channel group having a plurality of synthesizer channels to receive the audio instructions, and wherein the audio rendition manager includes a mapping component having mapping channels corresponding to the plurality of synthesizer channels;

the method further comprising:

assigning the mapping channels to receive the audio instructions; and routing the audio instructions to a particular synthesizer channel in accordance with the mapping channel assignments.

19. One or more computer-readable media comprising computer-executable instructions that, when executed, direct a computing system to perform the method of claim 18.

20. One or more computer-readable media comprising computer-executable instructions that, when executed, direct a computing system to perform the method of claim 1.

21. A method, comprising:

dynamically generating a performance manager that performs acts comprising:

receiving audio content from one or more sources;

providing an audio content component for each source of audio content, each audio content component generating event instructions from the received audio content;

processing the event instructions to produce audio instructions;

dynamically generating audio rendition managers that each correspond to an audio rendition, each audio rendition manager including dynamically allocated components that include a synthesizer component that receives the audio instructions and generates audio wave data, one or more audio buffers that process the audio wave data, and logical buses that each correspond to one of the audio buffers, each audio rendition manager:

assigning the audio wave data to one or more of the logical buses that each receive one or more streams of audio wave data from the synthesizer component, where at least one stream of audio wave data is assigned to more than one of the logical buses; and routing the audio wave data assigned to a particular logical bus to the audio buffer corresponding to said particular logical bus to render the corresponding audio renditions.

22. A method as recited in claim 21, wherein the performance manager is a component object having an interface that is callable by a software component.

23. A method as recited in claim 21, wherein the performance manager is a component object, and wherein each audio content component is a component object having an interface that is callable by the performance manager, the performance manager directing said generating the event instructions.

24. A method as recited in claim 21, wherein each audio rendition manager is a component object having an interface that is callable by a software component.

25. A method as recited in claim 21, wherein the performance manager is a component object, and wherein each audio rendition manager is a programming object having an interface that is callable by the performance manager.

26. A method as recited in claim 21, wherein the performance manager is a component object that performs said dynamically generating the audio rendition managers, and wherein each audio rendition manager is a component object having an interface that is callable by the performance manager.

27. One or more computer-readable media comprising computer-executable instructions that, when executed, direct a computing system to perform the method of claim 26.

28. A method as recited in claim 21, wherein the audio content includes digital audio samples.

29. A method as recited in claim 21, wherein the audio content includes MIDI data.

30. A method as recited in claim 21, wherein each audio content component has one or more event instruction components that perform said generating the event instructions.

31. A method as recited in claim 21, wherein each audio content component is a component object having an interface that is callable by the performance manager, and wherein each audio content component has one or more event instruction components that are component objects having an interface that is callable by the audio content component, the one or more event instruction components performing said generating the event instructions.

32. A method as recited in claim 21, further comprising each audio content component generating event instructions, and routing the event instructions to the audio rendition managers before said processing the event instructions.

33. A method as recited in claim 21, further comprising a particular audio content component generating event instructions, said processing the event instructions to produce audio instructions, and routing the audio instructions resulting from the particular audio content component to the audio rendition managers.

34. A method as recited in claim 21, wherein the audio rendition managers receive audio instructions originating as event instructions from one or more of the audio content components.

35. A method as recited in claim 21, wherein one audio rendition manager receives audio instructions originating as event instructions from one or more of the audio content components.

36. A method as recited in claim 21, wherein the synthesizer component is a component object having an interface that is callable by a software component.

37. A method as recited in claim 21, wherein each audio rendition manager is a component object, and wherein the synthesizer component is a component object having an interface that is callable by the audio rendition manager providing the synthesizer component.

38. A method as recited in claim 21, wherein the one or more audio buffers are component objects, each audio buffer having an interface that is callable by a software component.

39. A method as recited in claim 21, wherein each audio rendition manager is a component object, and wherein the one or more audio buffers are component objects, each audio buffer having an interface that is callable by the audio rendition manager providing the audio buffer.

40. A method as recited in claim 21, wherein the synthesizer component includes multiple channel groups, each channel group having a plurality of synthesizer channels that receive the audio instructions, and wherein each audio rendition manager includes a mapping component having mapping channels corresponding to the plurality of synthesizer channels, each audio rendition manager;

assigning the mapping channels to receive the audio instructions; and routing the audio instructions to the synthesizer channels in accordance with the mapping channel assignments.

41. One or more computer-readable media comprising computer-executable instructions that, when executed, direct a computing system to perform the method of claim 40.

42. One or more computer-readable media comprising computer-executable instructions that, when executed, direct a computing system to perform the method of claim 21.

43. An audio generation system, comprising:

a performance manager having an audio content component that generates event instructions from audio content received from one or more sources, the performance manager being dynamically generated and configured to process the event instructions to produce audio instructions;

audio rendition managers that are dynamically generated and that each correspond to an audio rendition, an audio rendition manager configured to receive the audio instructions and process the audio instructions to render the corresponding audio rendition, the audio rendition manager having dynamically allocated processing components including:

a synthesizer component having multiple channel groups, each channel group having a plurality of synthesizer channels configured to process the audio instructions to generate audio wave data;

a mapping component having mapping channels corresponding to the plurality of synthesizer channels, the mapping component configured to designate the synthesizer channels that receive the audio instructions via the respective mapping channels;

one or more audio buffers configured to process the audio wave data; and a multi-bus component that defines logical buses corresponding respectively to the one or more audio buffers, the multi-bus component configured to receive the audio wave data at the defined logical buses where at least one stream of audio wave data is assigned to more than one of the logical buses, and the multi-bus component further configured to route audio wave data that is received at a particular logical bus to the audio buffer corresponding to the particular logical bus.

44. An audio generation system as recited in claim 43, further comprising a second audio rendition manager that corresponds to a second audio rendition, the second audio rendition manager configured to receive the audio instructions and process the audio instructions to render the corresponding second audio rendition.

45. An audio generation system as recited in claim 43, further comprising a second audio rendition manager that corresponds to a second audio rendition, the second audio rendition manager configured to receive the audio instructions and process the audio instructions to render the corresponding second audio rendition, wherein the audio rendition and the second audio rendition are rendered together.

46. An audio generation system as recited in claim 43, wherein the performance manager is a component object having an interface that is callable by a software component.

47. An audio generation system as recited in claim 43, wherein the audio rendition manager is a component object having an interface that is callable by a software component.

48. An audio generation system as recited in claim 43, wherein the performance manager is a component object, and wherein the audio content component is a component object having an interface that is callable by the performance manager.

49. An audio generation system as recited in claim 43, wherein the performance manager is a component object, and wherein the audio rendition manager is a component object provided by the performance manager, the audio rendition manager having an interface that is callable by the performance manager.

50. An audio rendition manager, comprising:

a dynamically allocated synthesizer component having channel groups that each have synthesizer channels configured to receive audio instructions and produce one or more streams of audio wave data from the received audio instructions;

an additional dynamically allocated synthesizer component having additional channel groups that each have additional synthesizer channels configured to receive the audio instructions and produce the one or more streams of audio wave data from the received audio instructions;

a dynamically allocated mapping component having mapping channels corresponding to the synthesizer channels and the additional synthesizer channels, the mapping component configured to receive the audio instructions from one or more sources, designate the synthesizer channels and the additional synthesizer channels that receive the audio instructions via the respective mapping channels, and route the audio instructions to the synthesizer channels and to the additional synthesizer channels;

a plurality of dynamically allocated audio buffers that receive one or more of the streams of audio wave data; and a dynamically allocated multi-bus component that defines logical buses corresponding respectively to the plurality of audio buffers, the multi-bus component configured to receive the one or more streams of audio wave data at the defined logical buses and route one or more of the streams of audio wave data received at a particular logical bus to the audio buffer corresponding to the particular logical bus, and wherein at least one stream of audio wave data is assigned to more than one of the defined logical buses.

51. An audio rendition manager as recited in claim 50, further comprising a dynamically allocated performance manager that receives audio content from one or more sources, the performance manager configured to instantiate an audio content component for each source of audio content, each audio content component generating event instructions from the received audio content, and wherein the performance manager is configured process the event instructions to produce the audio instructions.

* * * * *